(12) United States Patent
Someya et al.

(10) Patent No.: US 8,694,882 B2
(45) Date of Patent: Apr. 8, 2014

(54) CONTROL DEVICE, METHOD OF CONTROLLING A RECORDING DEVICE, AND A STORAGE MEDIUM

(75) Inventors: Tomohito Someya, Tomi (JP); Yoshitake Sato, Torrance, CA (US)

(73) Assignee: Seiko Epson Corporation, Tokyo (JP)

( * ) Notice: Subject to any disclaimer, the term of this patent is extended or adjusted under 35 U.S.C. 154(b) by 612 days.

(21) Appl. No.: 12/948,674

(22) Filed: Nov. 17, 2010

(65) Prior Publication Data

US 2011/0122438 A1 May 26, 2011

(30) Foreign Application Priority Data

Nov. 20, 2009 (JP) ................... 2009-265188

(51) Int. Cl.
*G06F 17/00* (2006.01)
(52) U.S. Cl.
USPC ........................................................ 715/269
(58) Field of Classification Search
USPC ........................................................ 715/269
See application file for complete search history.

(56) References Cited

U.S. PATENT DOCUMENTS

| | | | | |
|---|---|---|---|---|
| 4,353,653 A * | 10/1982 | Zimmerman | .................... | 400/70 |
| 5,410,640 A * | 4/1995 | Morikawa et al. | ........... | 358/1.11 |
| 5,500,931 A * | 3/1996 | Sonnenschein | ............... | 715/234 |
| 5,506,940 A * | 4/1996 | Bamford et al. | ............. | 358/1.11 |
| 5,706,413 A | 1/1998 | Takabayashi et al. | | |
| 5,754,164 A * | 5/1998 | Yutani et al. | .................. | 345/471 |
| 5,771,034 A * | 6/1998 | Gibson | ........................ | 345/471 |
| 6,191,780 B1 * | 2/2001 | Martin et al. | ................ | 715/201 |
| 6,950,992 B2 * | 9/2005 | Shimamura | .................... | 715/781 |
| 7,565,359 B2 * | 7/2009 | Nazem et al. | .......................... | 1/1 |
| 7,664,323 B2 * | 2/2010 | Chellapilla et al. | ........... | 382/181 |
| 7,813,822 B1 * | 10/2010 | Hoffberg | ........................ | 700/94 |
| 8,150,736 B2 * | 4/2012 | Horn et al. | .................... | 705/26.1 |
| 2001/0019329 A1 * | 9/2001 | Kobayashi | ..................... | 345/467 |
| 2002/0087702 A1 * | 7/2002 | Mori | ............................. | 709/228 |
| 2003/0142331 A1 * | 7/2003 | Tanaka | .......................... | 358/1.9 |
| 2003/0142333 A1 * | 7/2003 | Nguyen et al. | ............... | 358/1.11 |
| 2004/0145760 A1 | 7/2004 | Kurumida | | |
| 2007/0115488 A1 * | 5/2007 | Engelman et al. | ........... | 358/1.13 |
| 2008/0079730 A1 * | 4/2008 | Zhang et al. | .................. | 345/468 |
| 2009/0284778 A1 * | 11/2009 | Hodder et al. | ............... | 358/1.11 |

FOREIGN PATENT DOCUMENTS

| | | |
|---|---|---|
| CN | 101149669 A | 3/2008 |
| JP | 02-185466 A | 7/1990 |
| JP | 06-183071 A | 7/1994 |
| JP | 08-016360 A | 1/1996 |
| JP | 09-152859 A | 6/1997 |
| JP | 09-325752 A | 12/1997 |
| JP | 2000-207392 A | 7/2000 |
| JP | 2002-175171 A | 6/2002 |
| JP | 2004-062786 A | 2/2004 |

* cited by examiner

*Primary Examiner* — Laurie Ries
(74) *Attorney, Agent, or Firm* — Kilpatrick Townsend & Stockton LLP (57) ABSTRACT

A recording device is made to record text after suitably correlating universal character code characters to font data that is actually stored in the printer. A printer 20 stores a plurality of code pages CP each storing font data for a plurality of characters that is used when recording text on a recording medium. Based on the plural code pages CP stored by the printer 20, a character code conversion table 18 that stores Unicode characters correlated to information identifying a code page CP containing font data corresponding to the Unicode character and information denoting the storage address of the font data on the code page CP is created or updated.

17 Claims, 8 Drawing Sheets

18

| Unicode CHARACTER | FIRST FONT ADDRESS INFORMATION FIELD | SECOND FONT ADDRESS INFORMATION FIELD | THIRD FONT ADDRESS INFORMATION FIELD |
|---|---|---|---|
| 60 | 61 | 62 | 63 |
| U + 0001(CARACTER A) | CODE PAGE CP2/ADDRES 1 | | |
| U + 0002(CARACTER B) | CODE PAGE CP1/ADDRES 3 | CODE PAGE CP2/ADDRES 4 | CODE PAGE CP3/ADDRES 1 |
| U + 0003(CARACTER C) | CODE PAGE CP1/ADDRES 1 | CODE PAGE CP3/ADDRES 5 | |
| ⋮ | | | |

| STORAGE ADDRESS | CODE PAGE | Unicode CHARACTER |
|---|---|---|
| ADDRESS 0 (80H) | CODE PAGE CP0 | U + 0001 |
| ADDRESS 1 (81H) | CODE PAGE CP0 | U + 0002 |
| ⋮ | ⋮ | ⋮ |
| ADDRESS 255 (FFH) | CODE PAGE CP0 | U + 31AC |

| Unicode CHARACTER | FIRST FONT ADDRESS INFORMATION FIELD | SECOND FONT ADDRESS INFORMATION FIELD | THIRD FONT ADDRESS INFORMATION FIELD |
|---|---|---|---|
| U + 0001(CARACTER A) | CODE PAGE CP2/ADDRES 1 | | |
| U + 0002(CARACTER B) | CODE PAGE CP1/ADDRES 3 | CODE PAGE CP2/ADDRES 4 | CODE PAGE CP3/ADDRES 1 |
| U + 0003(CARACTER C) | CODE PAGE CP1/ADDRES 1 | CODE PAGE CP3/ADDRES 5 | |
| ... | | | |

CONTROL DEVICE, METHOD OF CONTROLLING A RECORDING DEVICE, AND A STORAGE MEDIUM

This application claims priority under 35 U.S.C. §119 to Japanese Patent Application No. 2009-265188 filed on Nov. 20, 2009, the entire disclosure of which is expressly incorporated by reference herein.

BACKGROUND

1. Technical Field

The present invention relates to a control device that controls a recording device that records (prints) text or other content on a recording medium, to a method of controlling the recording device, and to a storage medium that stores a program for controlling the recording device.

2. Related Art

Japanese Unexamined Patent Appl. Pub. JP-A-H06-183071 teaches a printer as an example of a recording device that stores the font data (pattern data describing the placement of pixels used to print a font) used to record text at a specific address in ROM or other storage medium, and records (prints) text by reading the necessary font data from the specified address.

A plurality of font groups each containing a specified number of fonts for use with different languages or countries may also be stored in the storage medium of the recording device. To identify a particular character, the host computer (control device) specifies and sends a character code, specifies the font group containing the character, and specifies the address of the desired character in that font group. The character code identifies a particular character, and the character codes are stored in the printer correlated to the address and font group where the font data is stored.

Universal character codes that are used primarily on computers and other non-printer devices include universal character code sets that contain characters for a plurality of languages in a single unified character code set (one font group).

When using a printer that has a character code set containing a plurality of font groups to print a character code defined by a universal character code such as a single Unicode code point, for example, the universal character code must be correlated to the corresponding font group and address on the printer side to identify the corresponding font data. This means that the character described by a particular universal character code cannot be printed unless each character defined by a universal character code in the single universal font group is correlated to the font data that is actually stored in a plurality of font groups in the printer.

SUMMARY

When recording a character related to a universal character code in the recording device, a control device according to at least one embodiment of the present invention enables correlating the universal character code to the font data actually stored in the printer and then recording the desired character. Other aspects of the invention include a method of controlling the recording device and a storage medium storing the control method.

A first aspect of the invention is a control device that can be connected to and controls a recording device that records on a recording medium and stores a plurality of font groups each storing font data for a plurality of characters used to record text on the recording medium, the control device including a table processing unit that creates or updates a character code conversion table that correlates each of a plurality of universal character codes that are rendered in a single font group and are specified from the control device side to information identifying a font group on the recording device side containing font data corresponding to the universal character code and information denoting the storage address of the font data in the font group.

Font data as used herein refers to the actual data representing characters in a format enabling printing on a recording medium, and may include, for example, dot matrix font data, vector font data, outline font data, bitmap font data, and scalable font data. Content that may be expressed with font data includes figures, symbols, and images in addition to regular text. More specifically, font data is data for rendering the pixels that are actually printed on paper or other medium by the print head of a printer.

For each universal character code character defined by a specific universal character code, the table processing unit in this aspect of the invention creates or updates a character code conversion table that stores universal character code characters correlated to information identifying a font group containing font data corresponding to the universal character code and information denoting the storage location (address) of the font data in the font group based on the font groups that are recorded by the recording device. As a result, when the control device causes the recording device to record the character related to a universal character code character, the character can be recorded after suitably correlating the universal character code character specified from the control device side to the font data that is actually stored in the printer by using the character code conversion table that is created or updated by the table processing unit.

A recording device according to another aspect of the invention also has a storage unit that stores the character code conversion table, and a font group information storage unit that stores font group information correlating a specific universal character code to a recording device-side font group that corresponds to the universal character code. The table processing unit, based on the font group information stored in the font group information storage unit, creates or updates the character code conversion table that is stored in the font group information storage unit and correlates each universal character code to font group information identifying a font group on the recording device side containing font data corresponding to the universal character code and a font data address denoting the storage address of the font data in the font group.

With this aspect of the invention the table processing unit can generate or update a character code conversion table that correlates the font data actually stored in the recording device.

A control device according to another aspect of the invention preferably also has a conversion processing unit that, when a recording job instructing the recording device to record a character is asserted, converts a universal character code contained in the recording job to a font data address including information identifying a font group containing font data corresponding to the universal character code and information denoting the storage address of the font data in the font group, based on the character code conversion table created or updated by the table processing unit.

This aspect of the invention can correlate universal character codes to font data to reflect the font data that is actually stored in the recording device as a result of the conversion processing unit converting the universal character codes to font data addresses based on the character code conversion table.

With the control device according to another aspect of the invention, when identical font data is stored in a plurality of different font groups, and a plurality of universal character codes are contained in the recording job, the conversion processing unit converts the universal character codes in a specific order to font data addresses, and when converting one universal character code, first determines if, among the plural font groups, font data corresponding to the one universal character code is contained in the font group storing the font data corresponding to the most recently converted universal character code, and if the font data is stored in the most recently used font group, converts the one universal character code to a font data address including information denoting the address of the font data in the font group using information denoting the font group.

When a plurality of universal character code characters are converted to font data addresses in this aspect of the invention, processing efficiency can be improved because the font group is not changed when the font data corresponding to consecutive universal character codes is present in the same font group.

In a control device according to another aspect of the invention, the universal character codes and font data stored in the font groups can be edited.

This aspect of the invention improves convenience by enabling the user to change the relationship between universal character codes and font data as desired, and to create and correlate a user-defined font to universal character codes for use.

A control device according to another aspect of the invention preferably also has a font group information update processing unit that gets information identifying a plurality of font groups stored in the recording device from the recording device, and updates the font group information according to the plural font groups.

This aspect of the invention can make the font group information accurately reflect the font groups that are actually stored in the recording device.

Another aspect of the invention is a method of controlling a control device that controls a recording device that records on a recording medium and stores a plurality of font groups storing font data for a plurality of characters, the control method including steps of: creating or updating a character code conversion table that correlates each of a plurality of universal character codes that are rendered in a single font group and are specified from the control device side to information identifying a font group on the recording device side containing font data corresponding to the universal character code and information denoting the storage address of the font data in the font group; and based on this character code conversion table, converting the universal character code to a font data address including information identifying a font group containing font data corresponding to the universal character code character, and information denoting the address of the font data in the font group.

With the method according to this aspect of the invention, for each universal character code character defined by a specific universal character code, the table processing unit creates or updates a character code conversion table that stores universal character code characters correlated to information identifying a font group containing font data corresponding to the universal character code character and information denoting the storage location (address) of the font data in the font group based on the font groups that are recorded by the recording device. As a result, when the recording device is driven to record the character related to a universal character code character, the character can be recorded after suitably correlating the universal character code character to the font data that is actually stored in the printer by using the character code conversion table that is created or updated by a table processing unit.

Another aspect of the invention is a storage medium storing a program that is executed by a control unit that controls a control device connected to a recording device that records on a recording medium and stores a plurality of font groups storing font data for a plurality of characters, wherein: the program causes the control unit to operate as a table processing unit that creates or updates a character code conversion table that correlates each of a plurality of universal character codes that are rendered in a single font group and are specified from the control device side to information identifying a font group on the recording device side containing font data corresponding to the universal character code and information denoting the storage address of the font data in the font group.

With the program according to this aspect of the invention, for each universal character code character defined by a specific universal character code, the table processing unit creates or updates a character code conversion table that stores universal character code characters correlated to information identifying a font group containing font data corresponding to the universal character code character and information denoting the storage location (address) of the font data in the font group based on the font groups that are recorded by the recording device. As a result, when the recording device is driven to record the character related to a universal character code character, the character can be recorded after suitably correlating the universal character code character to the font data that is actually stored in the printer by using the character code conversion table that is created or updated by a table processing unit.

Effect of at least one embodiment of the invention

When recording characters related to universal character codes on a recording device, at least one embodiment of the invention enables recording the characters after appropriately correlating the universal character code characters to the font data that is actually stored in the printer.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of the present invention is described below with reference to the accompanying figures.

Figure 1:
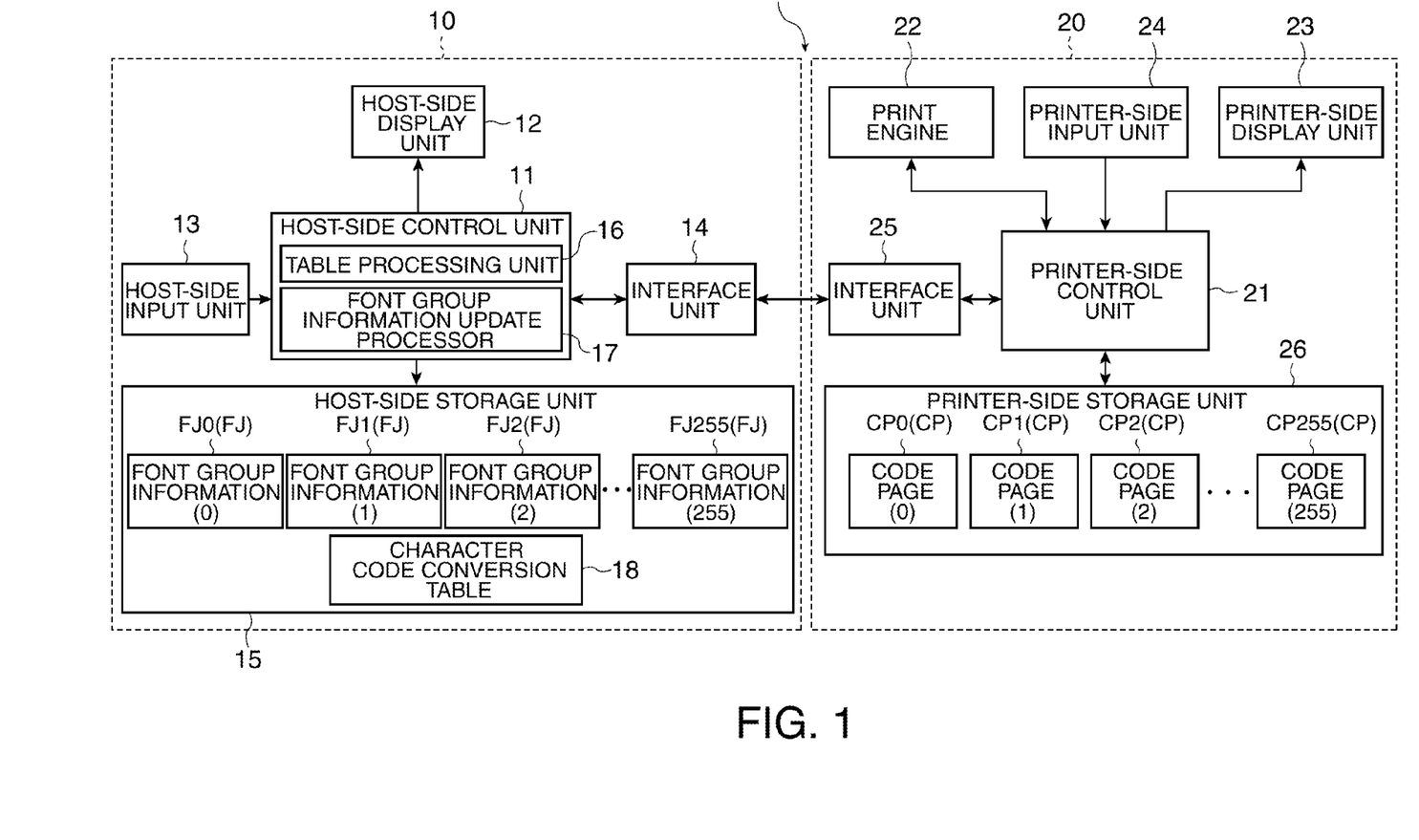
FIG. 1 is a block diagram of a printing system according to a preferred embodiment of the invention.

FIG. 1 is a block diagram showing the configuration of a printing system 1 according to a preferred embodiment of the invention.

As shown in FIG. 1, the printing system 1 includes a host computer 10 (control device) and a printer 20 (recording device) that is communicably connected to the host computer 10 and is controlled by the host computer 10.

The host computer 10 includes a host-side control unit 11, a host-side display unit 12, a host-side input unit 13, an input/output interface unit 14, and a host-side storage unit 15.

The host-side control unit 11 centrally controls other parts of the host computer 10, and includes a CPU as an operation processing unit, ROM that nonvolatilely stores the basic control program executed by the CPU and data related to the basic control program, RAM that temporarily stores programs executed by the CPU and data related to those programs, and other peripheral circuits.

A printer driver, which is a program for controlling the printer 20, is preinstalled to the host computer 10, and the host-side control unit 11 controls the printer 20 by calling the printer driver.

As shown in FIG. 1, the host-side control unit 11 has a table processing unit 16 and a font group information update processor 17 as further described below.

The host-side display unit 12 includes a display panel such as an LCD panel or organic EL panel, and displays information on the display panel as controlled by the host-side control unit 11.

The host-side input unit 13 is connected to an input device such as a keyboard or mouse, and outputs output signals from the input devices to the host-side control unit 11.

The interface unit 14 is connected to the printer 20 through a USB port, a parallel printer port, or other type of port, and communicates with the printer 20 as controlled by the host-side control unit 11 according to a particular communication standard.

The host-side storage unit 15 rewritably stores data, and has a hard disk drive, EEPROM, or other type of nonvolatile storage device. A plurality of font groups FJ (font group information FJ0 to FJ255), and a character code conversion table 18 containing information related to Unicode (universal character code) characters, are stored in the host-side storage unit 15. The host-side storage unit 15 functions as a font group information storage unit that stores font group information FJ.

The printer 20 includes a printer-side control unit 21, a print engine 22, a printer-side display unit 23, a printer-side input unit 24, an interface unit 25, and a printer-side storage unit 26.

The printer-side control unit 21 centrally controls other parts of the printer 20, and like the host-side control unit 11 includes a CPU, ROM, RAM, and other peripheral circuits.

The print engine 22 records images on the recording medium by controlling the print head that records images on the recording medium, the print head drive mechanism that drives the print head, a paper feed mechanism that conveys the recording medium, and other devices and mechanisms used to record images on the recording medium as controlled by the printer-side control unit 21.

The printer-side display unit 23 has a display device such as an LCD panel or LEDs that are used to report the printer 20 status and other information.

The printer-side input unit 24 includes such switches as a power switch and selection switch, detects operation of these switches, and inputs the result to the printer-side control unit 21.

The interface unit 25 communicates with the host computer 10 according to a particular communication standard as controlled by the printer-side control unit 21.

The printer-side storage unit 26 rewritably stores data in a nonvolatile storage device such as a hard disk drive or EEPROM. A plurality of code pages CP (font groups, code pages CP0 to CP255) are stored in the printer-side storage unit 26.

Figure 2:
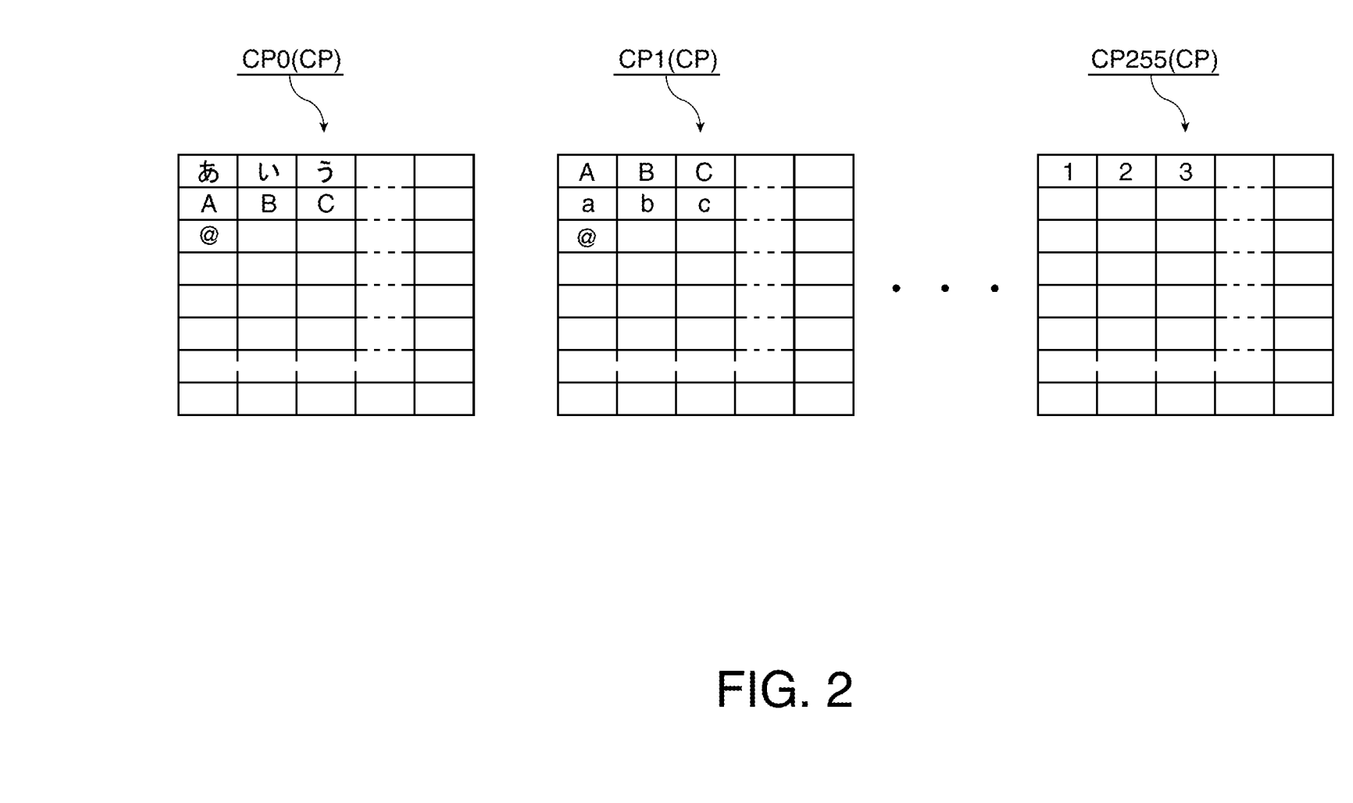
FIG. 2 describes the configuration of a code page.

FIG. 2 schematically describes the code pages CP.

In this embodiment of the invention 256 code pages CP, identified as code page CP0 to code page CP255, are stored in the printer-side storage unit 26. A code page CP is a font group containing data for a plurality of fonts. For example, code page CP0 may store Japanese font data while code page CP1 stores English font data. In this embodiment of the invention one code page CP stores font data for 128 characters. More specifically, 128 storage locations (addresses) are created by dividing the code page into 128 storage areas, and font data for one character can be stored in each storage location (at each address).

More specifically, 128 units of font data (font data for 128 characters) can be stored on one code page CP. A unique number (address) from 0 (80H) to 127 (FFH) is assigned to each storage location, and the font data for one character can be uniquely addressed by specifying where the font data is stored on which code page CP, that is, by means of information identifying the corresponding code page CP (such as CP1) and information identifying the location where the character is stored on that code page CP (such as address 50 (90H)).

Font data is the actual data that represents characters in a format enabling printing the characters on the recording medium, and may include, for example, dot matrix font data, vector font data, outline font data, bitmap font data, and scalable font data. The font data may be binary data with 1 representing a pixel that is printed and 0 representing a pixel that is not printed.

Instead of storing all font data on one code page CP in the printer-side storage unit 26, this embodiment of the invention stores font data for a predetermined number of characters (128) on one code page CP, and stores a plurality of such code pages CP (256). As a result, a code page CP0 that stores font data for Japanese, and a code page CP1 that stores font data for English, can be stored separately. Once the code page CP0 in which Japanese font data is stored in a printer 20 that uses Japanese is specified, the font data for a particular character can be fetched by specifying the address of that character on the same code page CP0. In a printer 20 that uses English, characters can be similarly retrieved by specifying the code page CP1 that stores English font data.

Storing only the required code pages CP in the printer-side storage unit 26 of the printer 20 is also conceivable, thereby efficiently utilizing the available storage space and improving the manufacturability of the printer 20.

Identical font data may also be stored on different code pages CP in this embodiment of the invention. For example, if code page CP0 is the code page CP storing font data for Japanese, and code page CP1 is the code page CP storing font data for English, common characters such as "A" and "@" that are used in both Japanese and English are stored on both code page CP0 and code page CP1. In this situation it is conceivable to store the actual font data only once and use a conversion table to read the shared font data from the single memory address even if the same character is called by different Japanese and English character codes.

Figure 3:
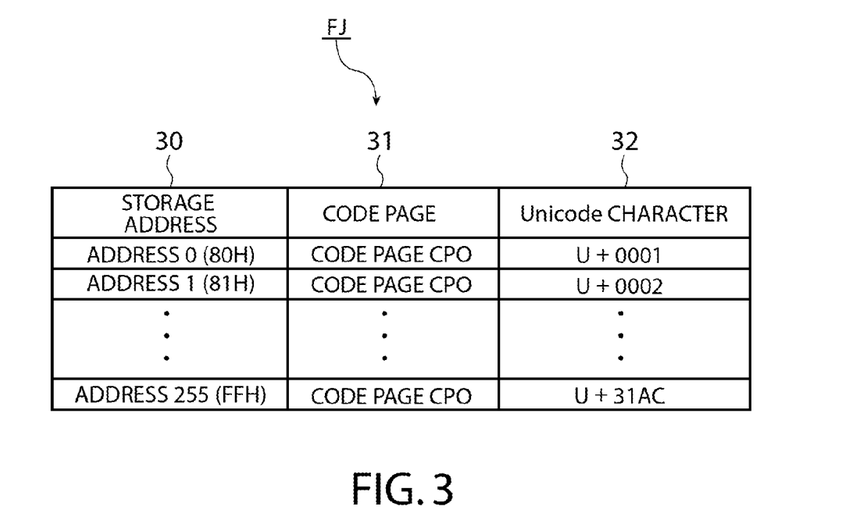
FIG. 3 describes font group information.

FIG. 3 schematically describes the font group information FJ.

The font group information FJ corresponds to the code pages CP and exists for each code page CP. In this embodiment of the invention font group information FJ0 to FJ255 correspond to code pages CP0 to CP255. FIG. 3 shows font group information FJ for code page CP0.

As shown in FIG. 3, one page of font group information FJ is information that correlates the storage locations (addresses) formed on the corresponding code page CP on the printer 20 side, the number of the corresponding code page, and the Unicode code point (universal character code) corresponding to the font data on the host computer 10 side. Each record in the font group information FJ contains an address (storage location) field 30, a code page field 31, and a Unicode field 32.

The storage location (address) of a particular character on the code page is stored in the address field 30, the number of the corresponding code page is stored in the code page field 31, and the Unicode code point identifying a specific Unicode character is stored in the Unicode field 32.

Unicode is a text encoding system that handles characters for different languages such as Japanese and English using a single code (one font group). A Unicode character is a single character specified in the Unicode standard, and a unique character code (code point) is assigned to each character. For convenience in this embodiment of the invention, one Unicode code point is uniformly a 16-bit code, and each Unicode code point is expressed by a four-digit hexadecimal value.

Note that as described above the same font data may be stored on a plurality of different code pages CP in this embodiment of the invention, and as a result the same Unicode character data may be stored in the Unicode field 32 of different font groups FJ.

The relationship between Unicode and font data is described next.

When a Unicode character is recorded on the recording medium by the printing system 1 according to this embodiment of the invention, the character corresponding to the Unicode code point is recorded according to the following basic process.

An application that can generate print data is executed on the host computer 10, and print data is generated for an image containing a Unicode character. Based on this print data the host-side control unit 11 that calls the printer driver generates a print command that causes the printer 20 to execute an operation to record the character identified by the Unicode code point. To produce this print command, the host-side control unit 11 produces information that identifies the code page CP and the address on that code page CP where the font data corresponding to the Unicode code point is stored, and based on this information generates a print command that includes a command to record an image corresponding to the font data at a specific location on the recording medium based on the font data stored at the specified address on the specified code page CP.

The host-side control unit 11 then outputs the resulting print command to the printer-side control unit 21 of the printer 20. Based on the input print command, the printer-side control unit 21 records the image on the recording medium.

As thus described, to record the character identified by one Unicode code point, the code page CP storing the font data corresponding to the one Unicode code point and the storage location (address) of the font data on that code page CP are identified, and the printer 20 records an image of that character based on the font data stored at the specified address.

The font group information FJ corresponding to a particular code page CP correlates the font data stored at the storage locations (addresses) formed on each code page CP to a particular Unicode code point.

In this embodiment of the invention the user can edit the font data stored on each code page CP by operating the host computer 10. The user can also create and register new fonts. In this embodiment of the invention editing the font data stored on a code page CP means defining the correlation between Unicode code point and font data, or storing new font data on code pages 254 and 255, which are code pages CP reserved for user-editable font data.

Note that a software program such as a utility program providing a user interface for editing font data stored in these code pages CP is preinstalled on the host computer 10 in this embodiment of the invention.

Figure 4:
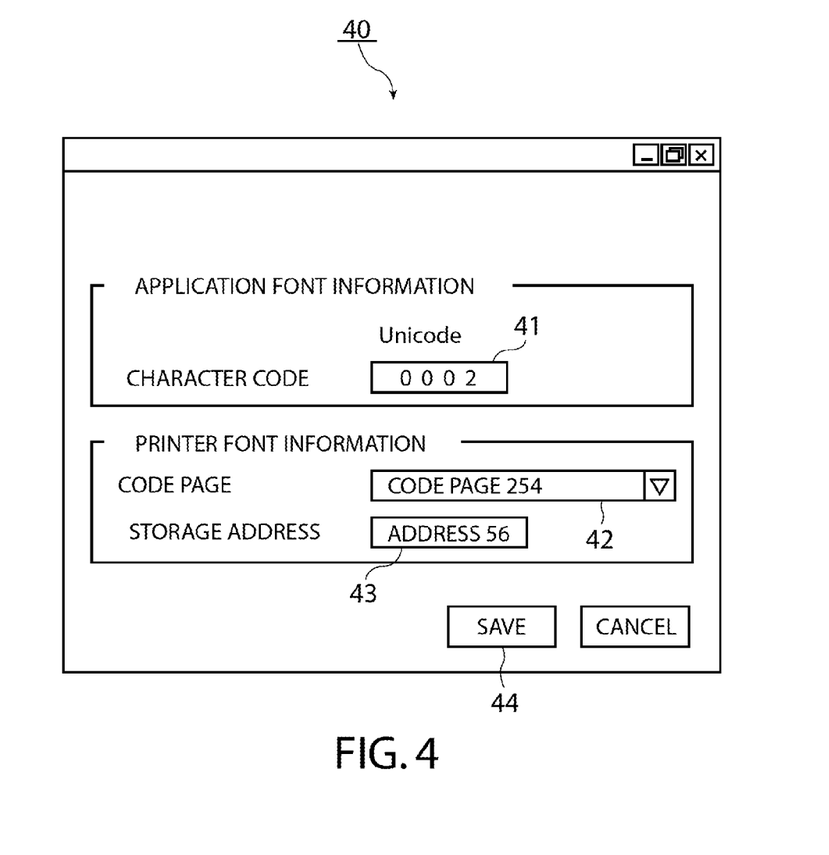
FIG. 4 shows an example of a configuration window.

FIG. 4 shows an example of a setup window 40, which is a window presented by a utility and is used to set the correlation between a Unicode code point and the corresponding font data.

To set the correlation between Unicode code point and font data, the user displays the setup window 40 on the host-side display unit 12. The setup window 40 is displayed by a function of the software program noted above. The user operates the host-side input unit 13 and inputs the Unicode code point to be configured in the character code field 41. The user also inputs a value denoting the code page CP storing the font data to be linked to the Unicode code point in the code page field 42, and inputs a value denoting the address where the font data to be correlated to the Unicode code point is stored in the identified code page CP in the address field 43. After inputting the appropriate values in the character code field 41, code page field 42, and address field 43, the user presses the save button 44. This registers the correlation between the Unicode code point and the desired font data, and creates or updates the character code conversion table 18 and font group information FJ.

Figure 5:
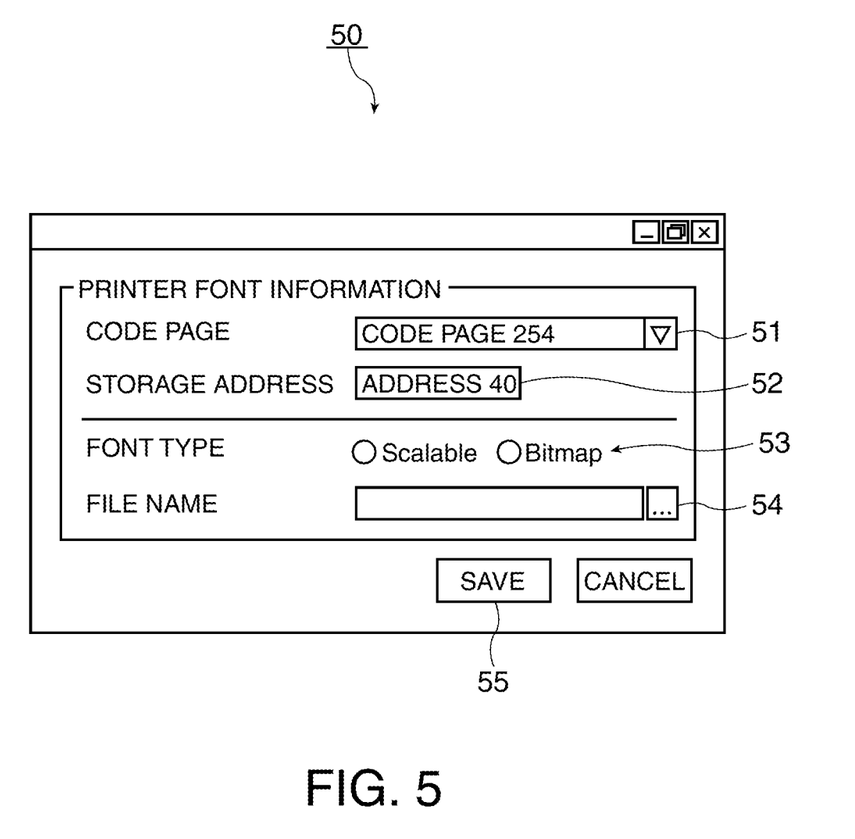
FIG. 5 shows an example of a storage window.

FIG. 5 shows an example of a storage window 50 that is used when storing font data to a desired address in code pages 254, 255.

To store font data at a desired address in code pages 254, 255, the user displays the storage window 50 on the host-side display unit 12. Using the host-side input unit 13, the user inputs a value denoting code page 254 or code page 255 as the code page CP to store the font data in the code page field 51, and inputs the address where the font data is stored in the address field 52. Next, the user selects the type of font data (scalable font, bitmap font, dot matrix font, or vector font in this embodiment of the invention) from the font type field 53, and inputs a value denoting the filename of the file storing the actual font data in the file name field 54. If there is only one type of font data, the filename may be omitted.

The actual font data can be created using a separate font editor utility or other software program. After inputting the appropriate values to each field, the user presses the save button 55. This stores the font data stored in the file of the filename entered in the file name field 54 to the address of the code page CP in the printer-side storage unit 26 identified by the values input to the code page field 51 and address field 52.

The operation of the font group information update processor 17 of the host-side control unit 11 is described next. Note that the operation of the font group information update processor 17 is achieved by the cooperation of hardware and software components such as by the CPU executing a program stored in ROM.

As described above, the user can define the correlation between Unicode code point and font data in this embodiment of the invention, and each time a correlation is set by the user, the font group information update processor 17 sets the correlation between the address and Unicode code point in the corresponding font group information FJ to reflect the content set by the user.

Furthermore, as also described above, the user can store font data to a desired address in code pages 254, 255 in this embodiment of the invention, and each time font data is stored to a desired address in code pages 254, 255 by the user, the font group information update processor 17 sets the correlation between the Unicode code point and address in the corresponding font group information FJ (font group information FJ254 or font group information FJ255) to reflect the user-defined content.

More specifically, the font group information update processor 17 functions to maintain a complete correlation between the code pages CP0 to CP255 and the font group information FJ0 to FJ255.

The operation of the table processing unit 16 of the host-side control unit 11 is described next. Note that the operation of the table processing unit 16 is achieved by the cooperation of hardware and software components such as by the CPU executing a program stored in ROM.

The table processing unit 16 generates a character code conversion table 18 based on the font group information FJ.

Figure 6:
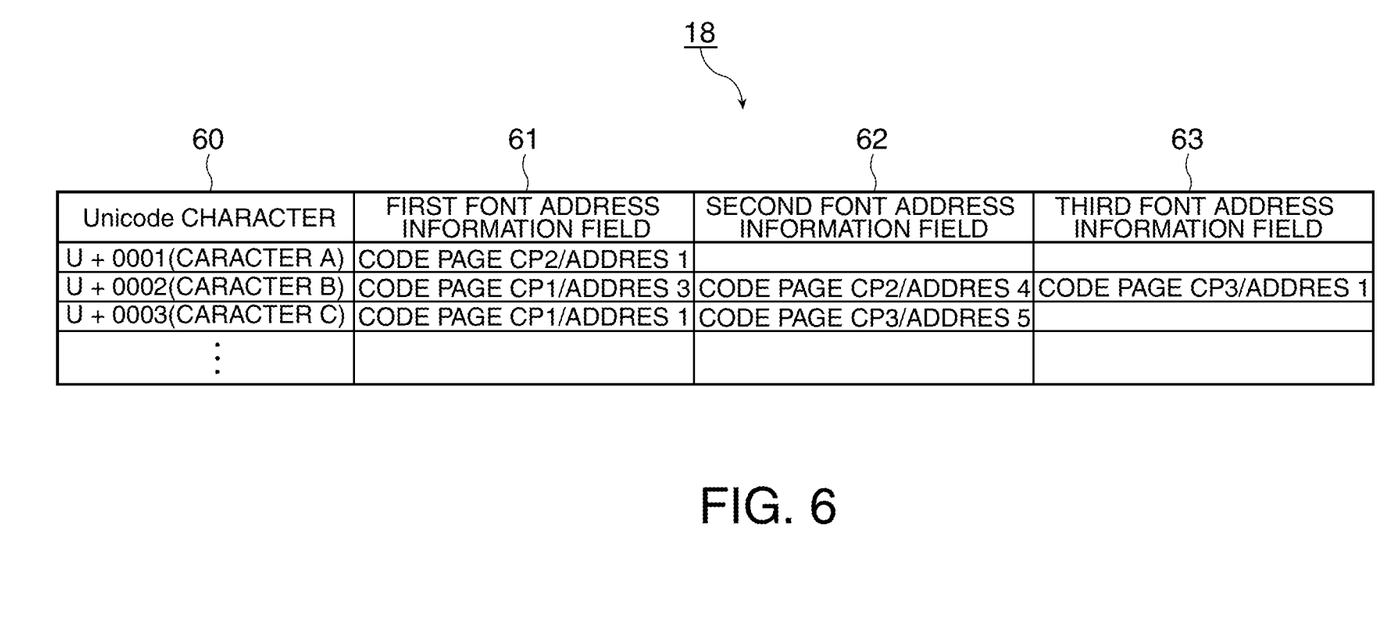
FIG. 6 shows an example of a character code conversion table.

FIG. 6 shows an example of a character code conversion table 18.

The character code conversion table 18 is a table that stores the correlation between a Unicode code point, and the code page CP and address on the code page CP where the font data corresponding to the Unicode code point is stored. In this example, each record in the character code conversion table 18 includes a Unicode field 60, a first font address information field 61, a second font address information field 62, and a third font address information field 63.

The Unicode code point identifying a Unicode character is stored in the Unicode field 60. Font data address information is stored in first to third third font address information fields 61 to 63. This font data address information is a data set including a value denoting a code page CP from code page CP0 to code page CP255, and the location (address) where the font data is stored on that code page CP.

The table processing unit 16 generates the character code conversion table 18 based on the font group information FJ as described below.

More specifically, the table processing unit 16 references Unicode fields 32 in all font group information FJ, and retrieves the code pages CP and addresses stored in all font groups FJ.

Based on the acquired code pages CP and addresses, the table processing unit 16 then generates one record of the character code conversion table 18 for each Unicode code point. Note that as described above the same code page CP and address (the same font data) may be stored in the Unicode field 60 of different font groups FJ, and in this situation a single record is generated for the same Unicode character instead of generating two records. Examples of this are the records for the letters B and C in the Unicode field 60.

The table processing unit 16 then references the address fields 30 in all font groups FJ, and gets the code page CP storing the font data and the address on the code page CP corresponding to a particular Unicode code point. As described above, the font data for one Unicode code point may be stored on plural different code pages CP in this embodiment of the invention. For convenience and brevity, font data for any single character is not stored on four or more code pages CP in this embodiment of the invention.

For each Unicode code point, the table processing unit 16 then generates and stores font data address information in the first to third font address information fields 61 to 63. This font data address information defines the code page CP where the font data for the Unicode code point is stored, and the address of the font data on that code page CP. When the font data is stored at plural addresses, the table processing unit 16 stores the font data address values sequentially to the first font address information field 61, second font address information field 62, and third font address information field 63. Examples of this are the records for the letters B and C in the Unicode field 60.

The table processing unit 16 thus generates the character code conversion table 18.

The table processing unit 16 produces the character code conversion table 18 at the following times.

For example, the table processing unit 16 produces the character code conversion table 18 each time the user edits font data stored on a code page CP and the font group information FJ is updated. The content of the character code conversion table 18 therefore always reflects the content edited by the user.

The table processing unit 16 also produces the character code conversion table 18 when the printer 20 is instructed to record an image. While described in further detail below, this enables recording an image using the newest character code conversion table 18.

The operation of the printing system 1 is described next using the flow chart in FIG. 7.

A precondition for the operation described below is that print data is produced by a function of software that can generate print data prepared on the host computer 10, and a command for recording this print data is asserted (a print job is created). In addition, Unicode characters are contained in the print data, and the print data is data for recording only the characters identified by the Unicode code points on a recording medium. However, as in the related art, there is also a function for identifying the code page containing the character in the print data received from the host computer 10 software, identifying the address of the character on the code page, and recording the character.

In addition, the host computer 10 functions in the following operation as a character conversion processing unit that converts Unicode code points to font data address information based on the character code conversion table 18.

The host-side control unit 11 of the host computer 10 first interprets the print data and extracts the Unicode code points from the print data (step SA1).

Next, the host-side control unit 11 determines if steps SA3 to SA5 were executed for all extracted Unicode code points (step SA2). More specifically, steps SA3 to SA5 are executed for each Unicode code point in the print data.

If these steps have not been executed for all of the extracted Unicode code points (step SA2 returns No), the host-side control unit 11 selects a Unicode code point that has not been processed yet (step SA3). If a text string is composed of plural Unicode code points, the host-side control unit 11 sequentially selects each Unicode code point starting from the first code point in the string. More specifically, when there are plural Unicode code points, the code points are processed in a specific sequence.

The host-side control unit 11 then references the character code conversion table 18 (step SA4), identifies the code page CP that stores the font data for the Unicode character selected for processing in step SA3 and the address of that character on the code page CP, converts the Unicode code point to font data address information (information denoting the specific code page CP and specific address) (step SA5), and then returns to step SA2.

The conversion process executed as step SA5 is described next with reference to the flow chart in FIG. 8.

Figure 8:
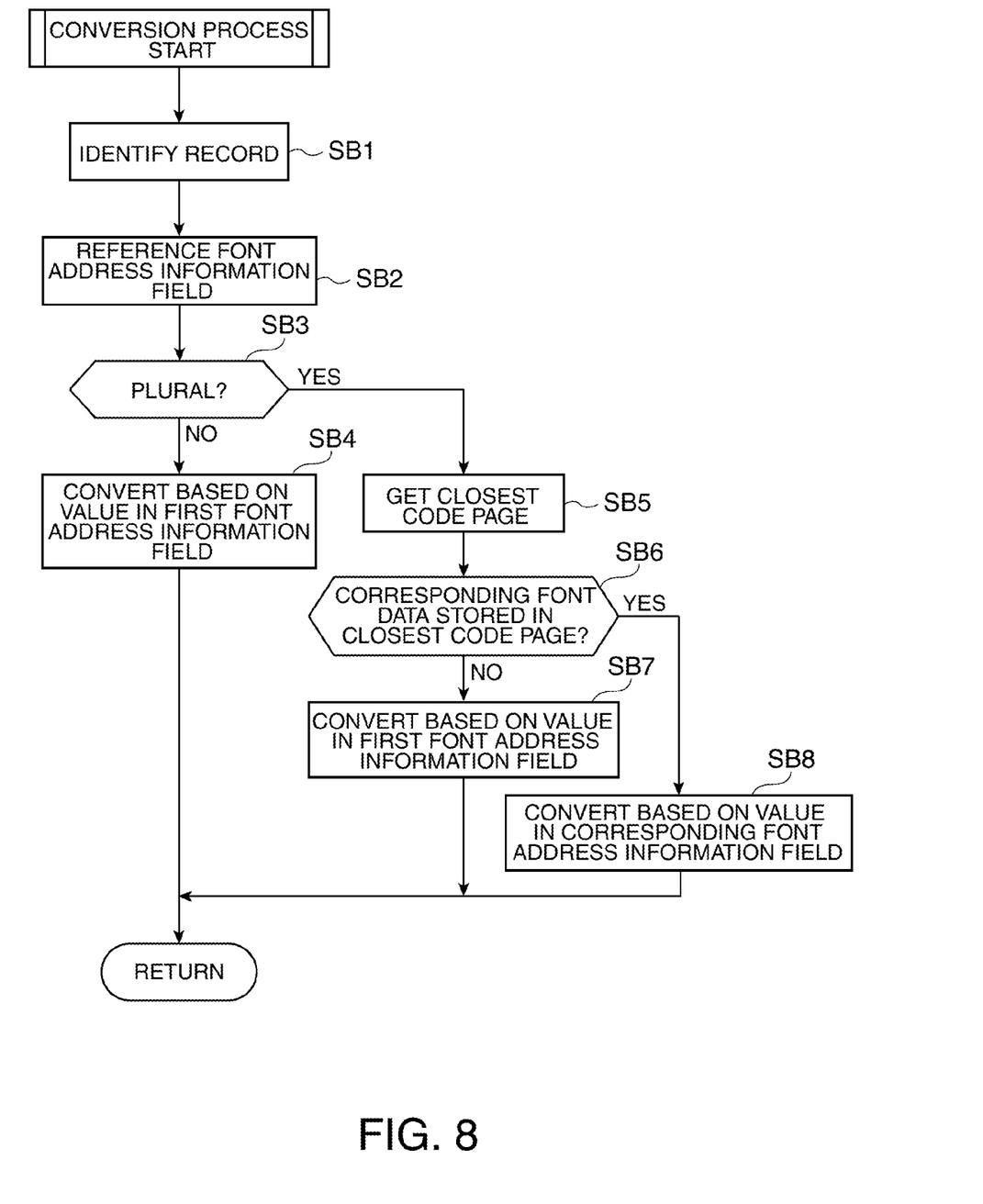
FIG. 8 is a flow chart describing the operation of the host computer.

FIG. 8 is a flow chart describing the operation of the host-side control unit 11 during the conversion process.

First, the host-side control unit 11 identifies the record in the character code conversion table 18 corresponding to the Unicode character selected in step SA3 for processing (referred to below as the "target Unicode character") (step SB1).

Next, the host-side control unit 11 references the first to third font address information fields 61 to 63 of the identified record (step SB2), and determines if the font data corresponding to the Unicode character is stored in plural different code pages CP (step SB3). Note that if font data address information is stored in the second font address information field 62, font data corresponding to that Unicode character is determined in step SB3 to be stored on plural different code pages CP, and font data corresponding to the Unicode character is otherwise determined to not be stored on plural different code pages CP.

If font data corresponding to the Unicode character is determined in step SB3 to not be stored on plural different code pages CP (step SB3 returns No), the host-side control unit 11 retrieves the font data address information stored in the first font address information field 61 of the record identified in step SB1, and converts the target Unicode character to the font data address indicated by the font data address information (step SB4).

However, if font data for the target Unicode character is stored on plural different code pages CP (step SB3 returns Yes), the host-side control unit 11 gets the font data address information retrieved from the most recently processed Unicode character, that is, the target Unicode character that was selected most recently (immediately) before the current target Unicode character (referred to as the "most recent Unicode character"), and gets the information denoting the code page CP contained in that font data address information (step SB5). The code page CP denoted by the information acquired in this step is referred to as the "most recent code page TCP." Note, further, that the host-side control unit 11 stores the font data address information converted from the most recent Unicode character in the host-side storage unit 15.

The host-side control unit 11 then references the first to third font address information fields 61 to 63 of the record identified in step SB1, and determines if font data for the target Unicode character is stored in the same code page CP as the most recent code page TCP (step SB6). The decision of this step SB6 is made by determining if font data address information containing data identifying the same code page CP as the most recent code page TCP is stored in any of the first to third font address information fields 61 to 63 of the record selected in step SB1.

If it is not stored (step SB6 returns No), the host-side control unit 11 gets the font data address information stored in the first font address information field 61 of the record selected in step SB1, and based on the acquired font data address information, converts the target Unicode character to the font data address indicated by the font data address information (step SB7).

If font data address information containing information identifying the same code page CP as the most recent code page TCP is stored (step SB6 returns Yes), the host-side control unit 11 gets the font data address information containing information denoting the same code page CP as the most recent code page TCP from the font data address information stored in the first to third font address information fields 61 to 63, and based on the acquired font data address information converts the target Unicode character to the font data address indicated by the font data address information (step SB8).

The conversion process described in FIG. 8 is described more specifically below with reference to FIG. 6.

In this example the character code conversion table 18 is configured as shown in FIG. 6. More specifically, the font data for the Unicode code point U+0001 (below, the letter A, which is a Unicode character) is stored at address 1 on code page CP2; the font data for Unicode code point U+0002 (below, the letter B) is stored at address 3 on code page CP1, address 4 on code page CP2, and address 1 on code page CP3; and the font data for Unicode code point U+0003 (below, letter C) is stored at address 1 on code page CP1 and address 5 on code page CP3. Letters A, B, and C are sequentially converted by referring to a character code conversion table 18 thus configured.

When the conversion process is executed for letter A, the host-side control unit 11 converts the letter A to a font data address (information specifying the code page CP and the address of the character on the code page CP) (step SB4) based on the font data address information stored in the first font address information field 61 because the font data for letter A is not stored on plural different code pages CP (step SB3 returns No).

When converting letter B, however, font data for letter B is stored on plural different code pages CP (step SB3 returns Yes). The host-side control unit 11 therefore retrieves code page CP2, which is the code page CP (most recent code page TCP) pointed to by information contained in the font data address information acquired for letter A, which is the most recent Unicode character (step SB5). The host-side control unit 11 then reads the first to third font address information fields 61 to 63 of the record corresponding to letter B, and determines if font data for letter B is stored in code page CP2 (most recent code page TCP) (step SB6). Because font data for letter B is stored in code page CP2 as indicated by the font data address information stored in the second font address information field 62 of the record for letter B (step SB6 returns Yes), the host-side control unit 11 converts letter B to a font data address based on the font data address information stored in the second font address information field 62 (based on the font data address information containing information denoting code page CP2) (step SB8).

When converting letter C, font data for letter C is also stored on plural different code pages CP (step SB3 returns Yes). The host-side control unit 11 therefore retrieves code page CP2, which is the code page CP (most recent code page TCP) pointed to by information contained in the font data address acquired for letter B, which is the most recent Unicode character (step SB5). The host-side control unit 11 then reads the first to third font address information fields 61 to 63 of the record corresponding to letter C, and determines if font data for letter C is stored in code page CP2 (most recent code page TCP) (step SB6). Because font data for letter C is not stored on code page CP2 (step SB6 returns No), the host-side control unit 11 converts letter C to a font data address based on the font data address information stored in the first font address information field 61 (step SB7).

Referring again to FIG. 7, if processing all Unicode characters is completed in step SA2 (step SA2 returns Yes), the host-side control unit 11 produces a print command (step SA6) and outputs the generated print command to the printer 20 (step SA7).

Figure 9:
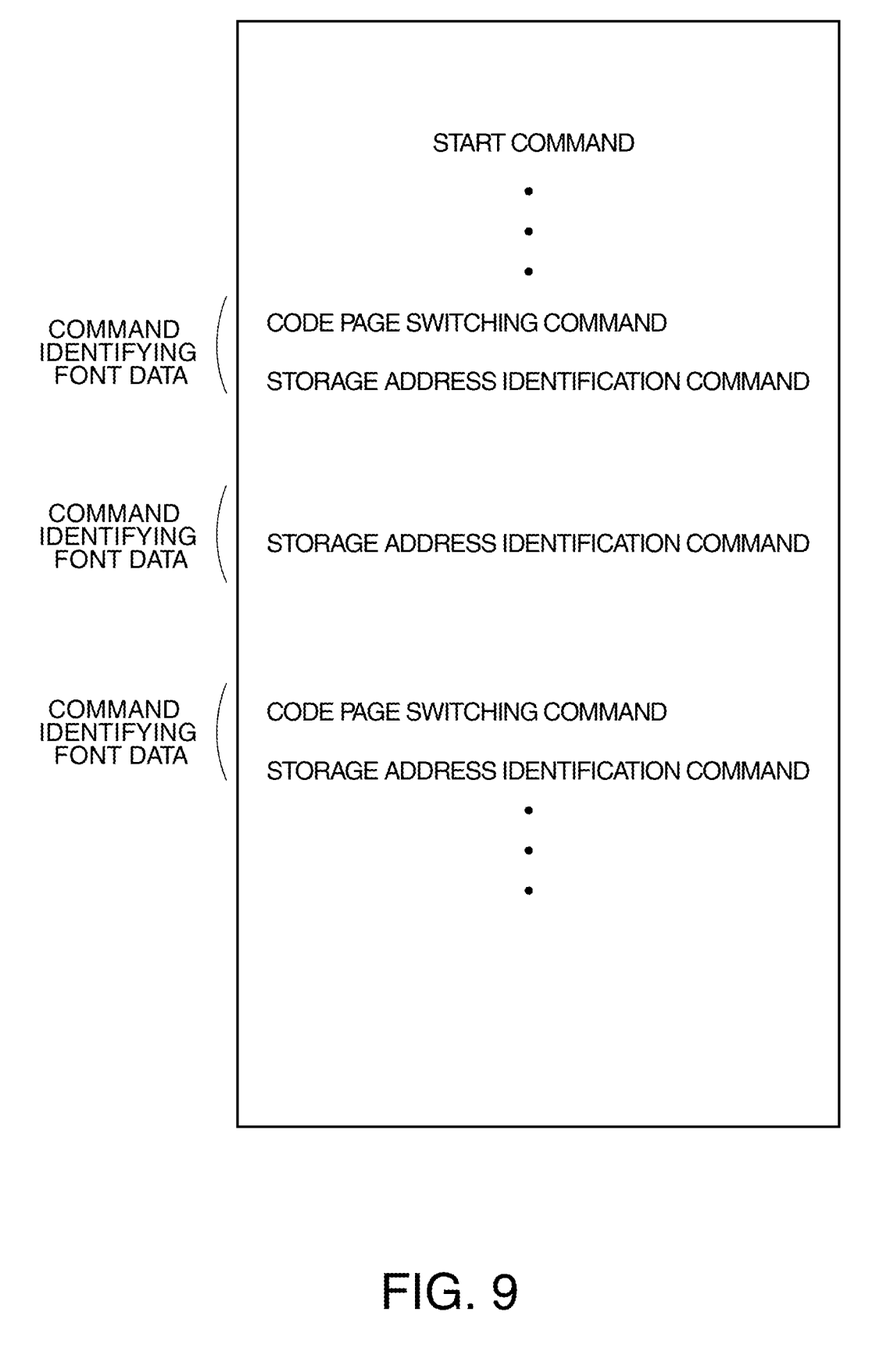
FIG. 9 describes a print command.

FIG. 9 schematically describes a print command produced by the host-side control unit 11.

As shown in FIG. 9, the print command identifies the font data for the characters to be recorded on the recording medium by combinations of a code page switching command and a storage address identification command.

Each Unicode code point (Unicode character) is converted by the conversion process described above to a font data address, and the font data address contains information identifying the code page CP where font data corresponding to a particular Unicode code point (character) is stored and the location of the font data on that code page CP. As a result, when generating the print command, the host-side control unit 11 generates for each Unicode character based on the result of the conversion process a command (code page switching command) that changes the code page CP referenced by the printer-side control unit 21 to the code page CP storing font data corresponding to the Unicode character, and a command (storage address identification command) specifying the location of the font data on that code page CP. Based on the code page switching command and storage address identification command, the printer-side control unit 21 to which the print command is input retrieves the font data corresponding to the one character to be recorded, and records an image of the character using the retrieved font data.

The code page switching command is a command for switching the code page CP referenced by the printer-side control unit 21 when determining the location where the font data is stored. Therefore, when font data for two consecutive Unicode characters is present on the same code page CP, switching the code page CP that was referenced to retrieve the first Unicode character to a different code page CP to retrieve the second Unicode character is not necessary. In this situation, a code page switching command is not needed with the command identifying the second Unicode character in the print command.

If a plurality of Unicode characters are consecutively converted and font data for a particular single Unicode character is stored on a plurality of different code pages CP, whether or not font data for the single Unicode character is stored on the most recent code page TCP is determined. If the font data is stored on the most recent code page TCP, the Unicode character is converted to a font data address containing information denoting the same code page CP as the most recent code page TCP and information denoting the storage address on that code page CP. As a result, when font data for consecutive Unicode characters is stored on the same code page CP, the information denoting the code pages CP contained in the font data addresses converted from the Unicode characters is the same. In this situation the number of code page switching commands can be reduced when generating the print command, processing efficiency can be improved by thus reducing the number of commands, and communication efficiency can be improved by reducing the amount of data that must be communicated between the host computer 10 and printer 20.

AS described above, the table processing unit 16 of the host-side control unit 11 in this embodiment of the invention creates or updates a character code conversion table 18 based on font group information FJ that is based on the code pages CP (font groups) stored in the printer 20. The character code conversion table 18 stores correlations between Unicode code points, information identifying the code page CP containing font data corresponding to a particular Unicode code point, and information identifying the address of the font data on the code page CP.

As a result, by using the character code conversion table 18 compiled or updated by the table processing unit 16 when the printer 20 records a character addressed by a particular Unicode code point, the desired character can be printed by appropriately correlating the Unicode code point to the font data that is actually stored in the printer 20.

Furthermore, for each of the plural code pages CP stored in the printer 20, the host computer 10 according to this embodiment of the invention stores font group information FJ that correlates the font data stored in each code page CP to the Unicode code points corresponding to the individual font data. Based on the font group information FJ stored in the host-side storage unit 15, the table processing unit 16 produces or updates the character code conversion table 18.

As a result, based on the font group information FJ, the table processing unit 16 can produce or update a character code conversion table 18 that corresponds to the font data actually stored in the printer 20.

In addition, when a print job instructing the printer 20 to record text is generated, the host-side control unit 11 according to this embodiment of the invention converts a Unicode code point contained in the print data to a font data address based on the character code conversion table 18. This font data address includes information denoting the code page CP containing font data corresponding to a particular Unicode code point, and information denoting the address where that font data is stored on that code page CP.

As a result of the host-side control unit 11 converting Unicode code points to font data addresses based on the character code conversion table 18, Unicode code points and font data can be correlated to reflect the font data that is actually stored in the printer 20.

The same font data may also be stored on different code pages CP in this embodiment of the invention. When plural Unicode code points are contained in the print data, the host-side control unit 11 converts the Unicode code points to font data addresses in a specific order. In addition, when converting one Unicode code point, the host-side control unit 11 first determines if the font data for the one Unicode code point being converted is contained on the code page CP that stores the font data corresponding to the most recently (last) converted Unicode code point. If the font data is stored on the same code page CP, the host-side control unit 11 converts the Unicode code point to a font data address including information denoting that code page CP and the address of the font data on that code page CP.

As a result, when converting a plurality of Unicode code points to font data addresses, processing efficiency can be improved when the font data for a string of consecutive universal character codes is present in the same font group.

This embodiment of the invention also enables a user to edit the font data stored on a code page CP.

As a result, the correlation between Unicode code points and font data can be changed as desired, the user can correlate a user-defined font to particular Unicode code points for use, and convenience can be improved.

The host computer 10 in this embodiment of the invention may be rendered with a font group information update processor 17 that correlates and updates the font group information FJ to the plurality of code pages CP stored in the printer.

This aspect of the invention can ensure that the font group information FJ accurately reflects the code pages CP that are actually stored in the printer 20.

It will be obvious to one with ordinary skill in the related art that the foregoing embodiment is simply a preferred embodiment of the invention, and can be adapted and applied as desired without departing from the scope of the accompanying claims.

For example, the printer 20 stores 256 code pages CP each capable of storing font data for 128 characters in the embodiment described above, but the configuration of the code pages CP stored in the printer 20 is not so limited and may be suitably changed according to the specifications of the printer 20, for example.

Figure 7:
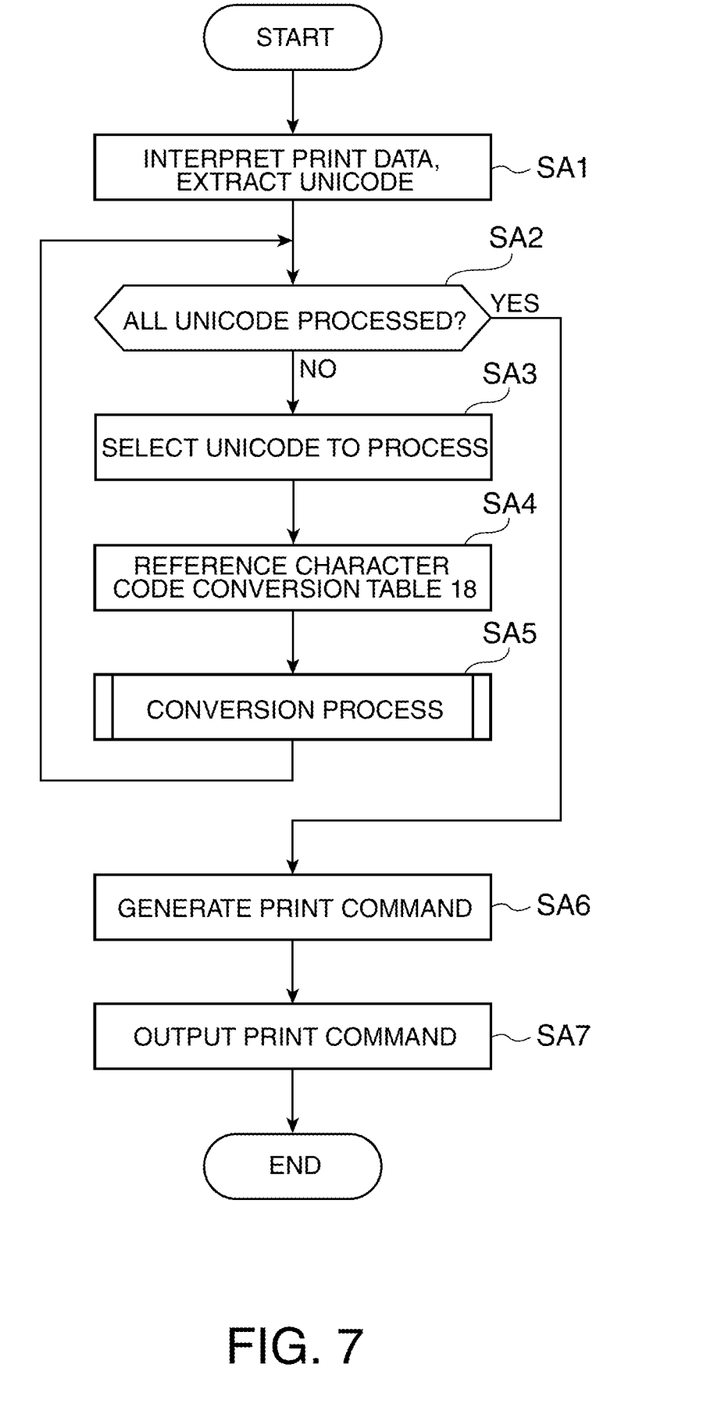
FIG. 7 is a flow chart describing the operation of the host computer.

A configuration in which a program that causes the host-side control unit 11 of the host computer 10 to execute the operation described in the flow charts in FIG. 7 and FIG. 8 is stored on a recording medium such as the host-side storage unit 15 or an external storage medium, and is read and executed by the host-side control unit 11, is also conceivable.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A control device that can be connected to and controls a recording device that records on a recording medium and stores a plurality of font groups each storing font data for a plurality of characters used to record text on the recording medium, the control device comprising a processor and a non-transitory computer readable medium having code executable by the processor, the control device comprising:
a table processing unit that creates or updates a character code conversion table that correlates each of a plurality of universal character codes that are rendered in a single font group and are specified from the control device side to information identifying a font group on the recording device side containing font data corresponding to the universal character code and information denoting the storage address of the font data in the font group; and
a conversion processing unit that, when a recording job instructing the recording device to record a character is asserted, converts a universal character code contained in the recording job to a font data address based on the character code conversion table created or updated by the table processing unit.

2. The control device described in claim 1, further comprising:
a storage unit that stores the character code conversion table; and
a font group information storage unit that stores font group information correlating a specific universal character code to a recording device-side font group that corresponds to the universal character code;
wherein the table processing unit, based on the font group information stored in the font group information storage unit, creates or updates the character code conversion table that is stored in the font group information storage unit and correlates each universal character code to information identifying a font group on the recording device side containing font data corresponding to the universal character code and information denoting the storage address of the font data in the font group.

3. The control device described in claim 1,
wherein the conversion processing unit converts the universal character code contained in the recording job to the font data address including information identifying a font group containing font data corresponding to the universal character code and information denoting the storage address of the font data in the font group, based on the character code conversion table created or updated by the table processing unit.

4. The control device described in claim 1, wherein:
when identical font data is stored in a plurality of different font groups, and a plurality of universal character codes are contained in the recording job,
the conversion processing unit converts the universal character codes in a specific order to the font data address, and when converting one universal character code, first determines if, among the plural font groups, font data corresponding to the one universal character code is contained in the font group storing the font data corresponding to the most recently converted universal character code, and if the font data is stored in the most recently used font group, converts the one universal character code to a font data address including information denoting the address of the font data in the font group using information denoting the font group.

5. The control device described in claim 1, wherein:
the universal character codes and font data stored in the font groups can be edited.

6. The control device described in claim 1, further comprising:
a font group information update processing unit that gets information identifying a plurality of font groups stored in the recording device from the recording device, and updates the font group information according to the plural font groups.

7. A method of controlling a control device that controls a recording device that records on a recording medium and stores a plurality of font groups storing font data for a plurality of characters, the control method comprising steps of:
creating or updating a character code conversion table that correlates each of a plurality of universal character codes that are rendered in a single font group and are specified from the control device side to information identifying a font group on the recording device side containing font data corresponding to the universal character code and information denoting the storage address of the font data in the font group; and
when a recording job instructing to record a character is asserted, converting the universal character code contained in the recording job to a font data address including information identifying a font group containing font data corresponding to the universal character code, and information denoting the address of the font data in the font group based on the character code conversion table.

8. The method of controlling a control device described in claim 7, further comprising steps of:
storing the character code conversion table in a storage unit;
storing font group information correlating a specific universal character code to a recording device-side font group that corresponds to the universal character code in a font group information storage unit; and
based on the font group information stored in the font group information storage unit, creating or updating the character code conversion table that is stored in the font group information storage unit and correlates each universal character code to information identifying a font group on the recording device side containing font data corresponding to the universal character code and information denoting the storage address of the font data in the font group.

9. The method of controlling a control device described in claim 7, comprising steps of:
converting the universal character codes in a specific order to font data addresses when identical font data is stored in a plurality of different font groups and a plurality of universal character codes are contained in the recording job;
first determining when converting one universal character code if, among the plural font groups, font data corresponding to the one universal character code is contained in the font group storing the font data corresponding to the most recently converted universal character code; and if the font data is stored in the most recently used font group, converting the one universal character code to a font data address including information denoting the address of the font data in the font group using information denoting the font group.

10. The method of controlling a control device described in claim 7, wherein:

the universal character codes and font data stored in the font groups can be edited.

11. The method of controlling a control device described in claim 7, further comprising a step of:

getting information identifying a plurality of font groups stored in the recording device from the recording device, and updating the font group information according to the plural font groups.

12. A storage medium storing a program that is executed by a control unit that controls a control device connected to a recording device that records on a recording medium and stores a plurality of font groups storing font data for a plurality of characters, wherein:

the program causes the control unit to operate as a table processing unit that creates or updates a character code conversion table that correlates each of a plurality of universal character codes that are rendered in a single font group and are specified from the control device side to information identifying a font group on the recording device side containing font data corresponding to the universal character code and information denoting the storage address of the font data in the font group, wherein when a recording job instructing the recording device to record a character is asserted, the stored program converts a universal character code contained in the recording job to a font data address based on the character code conversion table created or updated by the table processing unit.

13. The storage medium described in claim 12, wherein the stored program includes steps of:

storing the character code conversion table in a storage unit;

storing font group information correlating a specific universal character code to a recording device-side font group that corresponds to the universal character code in a font group information storage unit; and based on the font group information stored in the font group information storage unit, creating or updating the character code conversion table that is stored in the font group information storage unit and correlates each universal character code to information identifying a font group on the recording device side containing font data corresponding to the universal character code and information denoting the storage address of the font data in the font group.

14. The storage medium described in claim 12, wherein:

the stored program converts the universal character code contained in the recording job to the font data address including information identifying a font group containing font data corresponding to the universal character code and information denoting the storage address of the font data in the font group, based on the character code conversion table created or updated by the table processing unit.

15. The storage medium described in claim 12, wherein the stored program comprises steps of:

converting the universal character codes in a specific order to the font data addresses when identical font data is stored in a plurality of different font groups and a plurality of universal character codes are contained in the recording job;

first determining when converting one universal character code if, among the plural font groups, font data corresponding to the one universal character code is contained in the font group storing the font data corresponding to the most recently converted universal character code; and if the font data is stored in the most recently used font group, converting the one universal character code to a font data address including information denoting the address of the font data in the font group using information denoting the font group.

16. The storage medium described in claim 12, wherein the stored program enables editing the universal character codes and font data stored in the font groups.

17. The storage medium described in claim 12, wherein the stored program further comprises a step of:

getting information identifying a plurality of font groups stored in the recording device from the recording device, and updating the font group information according to the plural font groups.

* * * * *